(12) United States Patent
Naveh et al.

(10) Patent No.: US 12,293,256 B1
(45) Date of Patent: May 6, 2025

(54) OPTIMIZING QUANTUM CIRCUITS WITH PERMUTABLE INPUT REGISTERS

(71) Applicant: Classiq Technologies LTD., Tel Aviv (IL)

(72) Inventors: Amir Naveh, Haifa (IL); Shmuel Ur, Shorashim (IL); Eyal Cornfeld, Ramat Gan (IL); Nati Erez, Kfar Yona (IL); Nir Minerbi, Haifa (IL)

(73) Assignee: CLASSIQ TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 18/894,471

(22) Filed: Sep. 24, 2024

(51) Int. Cl.
*G06N 10/20* (2022.01)

(52) U.S. Cl.
CPC ................................ *G06N 10/20* (2022.01)

(58) Field of Classification Search
CPC ....................................................... G06N 10/20
See application file for complete search history.

(56) References Cited

U.S. PATENT DOCUMENTS

| | | | |
|---|---|---|---|
| 9,665,829 B1* | 5/2017 | Jasionowski | G01R 31/3177 |
| 11,868,846 B1* | 1/2024 | Shields | G06F 11/3457 |
| 2017/0228483 A1* | 8/2017 | Rigetti | G06N 10/40 |
| 2019/0332731 A1* | 10/2019 | Chen | G06F 17/16 |

* cited by examiner

*Primary Examiner* — Nghia M Doan
(74) *Attorney, Agent, or Firm* — Tutunjian & Bitetto, P.C.

(57) ABSTRACT

A method for optimizing a quantum circuit includes obtaining a quantum circuit model comprising one or more quantum operations, wherein at least one quantum operation is marked as having permutable input registers. An optimization goal for the quantum circuit is determined. A processor selects a permutation of the input registers for the at least one marked quantum operation based on the optimization goal. An optimized quantum circuit is generated based on the selected permutation. The method may further include providing the generated optimized quantum circuit for execution by a quantum execution platform.

18 Claims, 8 Drawing Sheets

OPTIMIZING QUANTUM CIRCUITS WITH PERMUTABLE INPUT REGISTERS

TECHNICAL FIELD

The present disclosure relates to quantum computing in general, and to optimizing quantum circuits through permutation of input registers, in particular.

BACKGROUND

Quantum computing has emerged as a promising paradigm for solving complex computational problems that are intractable for classical computers. As quantum hardware continues to advance, there is an increasing need for efficient methods to design and optimize quantum circuits. Quantum circuits consist of sequences of quantum gates applied to qubits, with the arrangement and types of gates determining the computation performed. However, optimizing quantum circuits presents unique challenges due to the probabilistic nature of quantum systems and hardware constraints.

One area of particular interest in quantum circuit design is the optimization of input register assignments. Many quantum operations have the property that some input qubits can be interchanged without affecting the logical function of the operation. Leveraging this permutability of inputs could potentially lead to more efficient circuit implementations. However, existing quantum compilers and optimization techniques often do not fully exploit these permutation opportunities, leaving room for improvement in circuit depth, gate count, and error rates. As quantum devices scale up, developing methods to systematically optimize input register assignments will be crucial for realizing the full potential of quantum algorithms.

BRIEF SUMMARY

One exemplary embodiment of the disclosed subject matter is a method for optimizing a quantum circuit. The method comprises obtaining a quantum circuit model comprising one or more quantum operations, wherein at least one quantum operation is marked as having permutable input registers. The method further comprises determining an optimization goal for the quantum circuit. The method also includes selecting, by a processor, a permutation of the input registers for the at least one marked quantum operation based on the optimization goal. Additionally, the method comprises generating an optimized quantum circuit based on the selected permutation.

Optionally, the optimization goal is based on at least one of: circuit depth, circuit width, gate count, or error rate.

Optionally, selecting the permutation comprises using a greedy algorithm to optimize the quantum circuit incrementally.

Optionally, selecting the permutation comprises using an optimization solver to optimize the quantum circuit globally.

Optionally, the method further comprises replacing qubits of undecided permutable operations with a placeholder circuit during optimization.

Optionally, the method further comprises performing an intermediate transpilation step to reassign qubits based on the selected permutation before generating the optimized quantum circuit.

Optionally, the method further comprises providing the generated optimized quantum circuit for execution by a quantum execution platform.

Optionally, obtaining the quantum circuit model comprises obtaining an unmarked quantum circuit model and automatically marking the at least one quantum operation as having permutable input registers.

Another exemplary embodiment of the disclosed subject matter is a system for optimizing a quantum circuit. The system comprises a memory storing instructions and a processor configured to execute the instructions. The processor is configured to obtain a quantum circuit model comprising one or more quantum operations, wherein at least one quantum operation is marked as having permutable input registers. The processor is further configured to determine an optimization goal for the quantum circuit. Additionally, the processor is configured to select a permutation of the input registers for the at least one marked quantum operation based on the optimization goal. The processor is also configured to generate an optimized quantum circuit based on the selected permutation.

Optionally, the optimization goal is based on at least one of: circuit depth, circuit width, gate count, or error rate.

Optionally, selecting the permutation comprises using a greedy algorithm to optimize the quantum circuit incrementally.

Optionally, selecting the permutation comprises using an optimization solver to optimize the quantum circuit globally.

Optionally, the processor is further configured to replace qubits of undecided permutable operations with a placeholder circuit during optimization.

Optionally, the processor is further configured to perform an intermediate transpilation step to reassign qubits based on the selected permutation before generating the optimized quantum circuit.

Optionally, the processor is further configured to provide the generated optimized quantum circuit for execution by a quantum execution platform.

Optionally, obtaining the quantum circuit model comprises obtaining an unmarked quantum circuit model and automatically marking the at least one quantum operation as having permutable input registers.

Yet another exemplary embodiment of the disclosed subject matter is a non-transitory computer-readable storage medium storing program instructions that, when executed by a processor, cause the processor to perform operations. The operations comprise obtaining a quantum circuit model comprising one or more quantum operations, wherein at least one quantum operation is marked as having permutable input registers. The operations further comprise determining an optimization goal for the quantum circuit. Additionally, the operations include selecting a permutation of the input registers for the at least one marked quantum operation based on the optimization goal. The operations also comprise generating an optimized quantum circuit based on the selected permutation.

Optionally, the optimization goal is based on at least one of: circuit depth, circuit width, gate count, or error rate.

Optionally, selecting the permutation comprises using a greedy algorithm to optimize the quantum circuit incrementally.

Optionally, selecting the permutation comprises using an optimization solver to optimize the quantum circuit globally.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
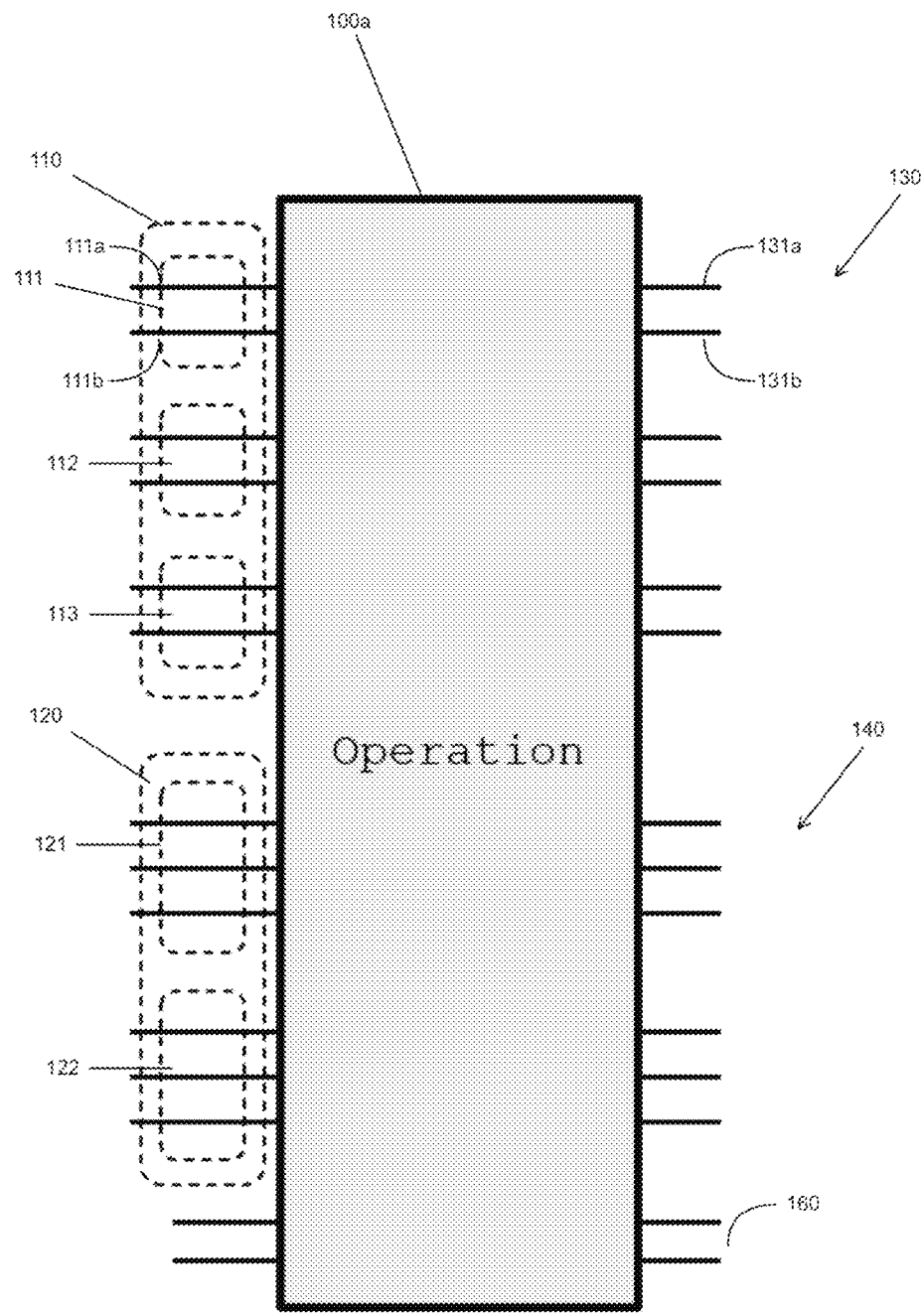
FIG. 1A illustrates a block diagram of a quantum circuit system with permutable registers, in accordance with some exemplary embodiments of the disclosed subject matter.

One technical problem dealt with by the disclosed subject matter is to enhance the efficiency and performance of quantum circuits through optimized permutation of input registers. In some exemplary embodiments, quantum operations within a quantum circuit may have input registers that can be permuted or interchanged without affecting the logical function of the operation. In some exemplary embodiments, the permutability of these input registers presents an opportunity for circuit optimization that is not fully exploited by existing quantum compilers and optimization techniques. In addition, in some cases, permutation may be useful due to hardware constraints, such as connectivity constraints of the quantum execution platform. As an example maybe the circuit X1 has a gate with Y1, and X2 with Y2. If they are not directly connected in the hardware, they may need to be swapped using a swap chain to implement the gate. It could be that the swap chain will be shorter (or even not required) if X1 and X2 are permuted. Hence, the permutation may be decided by the hardware compiler or any other compiler that is aware of the hardware constraints.

In some exemplary embodiments, the selection of an optimal permutation for input registers can significantly impact the overall performance of a quantum circuit. In some exemplary embodiments, factors such as circuit depth, circuit width, gate count, and error rates may be improved through strategic permutation of input registers. In some exemplary embodiments, the challenge lies in identifying which input registers are permutable and determining the optimal permutation that aligns with specific optimization goals.

In some exemplary embodiments, the process of optimizing quantum circuits through input register permutation may involve complex decision-making and analysis. In some exemplary embodiments, this optimization process may need to consider multiple factors simultaneously, such as the interdependencies between different quantum operations within the circuit and the impact of permutations on subsequent operations. In some exemplary embodiments, the optimization process may balance local optimizations with global circuit performance.

In some exemplary embodiments, the scalability of input register permutation optimization techniques may present challenges as quantum circuits grow in complexity and size. In some exemplary embodiments, efficient methods for handling large-scale quantum circuits with numerous permutable operations may be necessary to ensure the practicality and effectiveness of the optimization process.

One technical solution is to implement an adaptive optimization approach for permuting input registers in quantum circuits. In some exemplary embodiments, a system may be deployed that dynamically selects and applies different optimization strategies based on the size and complexity of the quantum circuit being optimized.

In some exemplary embodiments, the system may employ a greedy algorithm that incrementally optimizes the circuit by selecting permutations for each operation in a specific order. The order may be a topological order, or any other predetermined order. Additionally, or alternatively, the order may be based on a heuristic. For example, one heuristic may be based on the estimated potential improvement of each operation. In each step, the operation with the highest estimated potential of improvement is selected. The heuristic function may be evaluated once in the beginning. Additionally, or alternatively, the heuristic function may be re-evaluated after each operation is handled, as changes that may have been implemented may potentially affect the estimated potential of improvement. This approach can provide quick optimizations or optimizations for complicated designs, when the more computationally intensive solutions may not be feasible.

Additionally, or alternatively, the system may utilize a Constraint Satisfaction Problem (CSP) solver to perform global optimization across multiple permutable operations simultaneously. The CSP solver can consider interdependencies between different quantum operations and find optimal permutations that maximize overall circuit performance. In some exemplary embodiments, the CSP solver may be utilized, when applicable. However, in cases where the CSP approach does not scale or is not feasible, such as in very larger, complex circuits, the greedy approach, which scales well, may be used instead.

In some exemplary embodiments, the system may implement a hierarchical optimization strategy to handle large-scale quantum circuits. This approach involves partitioning the circuit into smaller subcircuits, optimizing each subcircuit independently (e.g., an potentially using a different optimization method), and then combining the optimized subcircuits while considering inter-subcircuit dependencies. This hierarchical approach can significantly reduce the computational complexity of optimizing large circuits while still achieving near-optimal results.

Additionally, the system may employ heuristic techniques to guide the optimization process for large circuits. In some exemplary embodiments, a graph-state placeholder technique may be used when evaluating undecided permutations in a subcircuit. This involves temporarily replacing the qubits of permutable operations with a placeholder circuit, such as symmetric graph state, a "blackbox" circuit, or the like, allowing for efficient estimation of the impact of different permutations without fully evaluating all possibilities. In some cases, the blackbox circuit may be a fake circuit that cannot be expanded and that acts on all qubits such that the depth from each input qubit to each output qubit is some statistical estimate of all permutations, e.g., min depth, max depth, median depth, mean depth, etc. In some cases, other properties that may or may not depend on the permutation may be attributed to the blackbox circuit, such as auxiliary count, gate count, etc. A property that depends on permutation can be replaced with a statistical estimate.

The system may incorporate machine learning techniques to improve optimization efficiency over time. By analyzing patterns in successful optimizations across multiple circuits, the system can learn to predict promising permutations more quickly, reducing the search space for optimization algorithms and improving scalability for large circuits.

Furthermore, the system may implement parallel processing techniques to distribute the optimization workload across multiple computational resources. This can include parallelizing the evaluation of different permutations, running multiple optimization algorithms concurrently, or distributing the optimization of different subcircuits across a cluster of processors.

In some exemplary embodiments, the system may employ an iterative refinement approach for large circuits. This involves performing an initial optimization pass using faster, approximate methods, and then iteratively refining the solution using more precise optimization techniques on smaller portions of the circuit identified as having the highest potential for improvement.

By combining these adaptive and scalable optimization techniques, the system can effectively handle the challenges posed by large-scale quantum circuits with numerous permutable operations, ensuring practical and efficient optimization across a wide range of circuit sizes and complexities.

Another technical solution is to implement a flexible annotation system for identifying permutable registers in quantum circuits. In some exemplary embodiments, the system may allow users to manually annotate permutable registers within quantum operations. This manual annotation process may provide valuable insights and serve as a guide for the optimization algorithms which may be employed during the compilation or transpilation process that the circuit undergoes.

In some exemplary embodiments, the system may provide a user interface that allows quantum circuit designers to specify which input registers of a given operation can be permuted. This manual annotation may capture domain-specific knowledge and design intentions that may not be immediately apparent to automated optimization techniques. The system may use these annotations as constraints or preferences during the optimization process, potentially leading to more meaningful and context-aware optimizations. The annotation may allow the circuit designer to indicate which registers are permutable therebetween, which sets of registers are permutable therebetween, which sets of sets of registers are permutable therebetween, and so forth. Additionally, or alternatively, the annotation may indicate mapping between inputs and outputs, and indicate whether the outputs should be similarly permuted.

Additionally, or alternatively, the system may incorporate automatic identification of permutable registers. In some exemplary embodiments, this automatic identification may be based on comparing the gates or operations in the quantum circuit to a pre-annotated library of known quantum operations. The system may maintain a database of common quantum gates and their permutability properties, which can be used to automatically annotate similar structures in new circuits. In some cases, the database may include gates which were previously manually annotated.

In some exemplary embodiments, the system may analyze the usage of output registers to automatically determine whether the output needs to correspond to the input and be similarly permuted. This analysis may involve examining the data flow through the circuit and identifying which outputs are used in subsequent operations. Based on this analysis, the system may determine which outputs can be treated as "junk" and do not need to maintain a specific correspondence with the input registers.

In some exemplary embodiments, the system may provide visualization tools that highlight annotated permutable registers within the quantum circuit diagram. This visual feedback may help users understand the optimization opportunities present in their circuits and guide further manual annotations or circuit design decisions.

In some exemplary embodiments, the system may combine manual annotation capabilities with automatic identification techniques, which may enable the system to create a robust and flexible approach to identifying permutable registers in quantum circuits. This hybrid approach may leverage both human expertise and computational analysis to enable more effective and context-aware optimizations across a wide range of quantum circuit designs.

One technical effect obtained by the disclosed subject matter is enhancing the efficiency and performance of quantum circuits through optimized permutation of input registers. In some exemplary embodiments, strategic permutation of input registers can lead to significant improvements in circuit depth, circuit width, gate count, and error rates, resulting in more efficient quantum computations.

Another technical effect obtained by the disclosed subject matter is providing a flexible and comprehensive system for identifying permutable registers in quantum circuits. The combination of manual annotation capabilities and automatic identification techniques allows for a robust approach that leverages both human expertise and computational analysis, enabling more effective and context-aware optimizations across a wide range of quantum circuit designs.

Yet another technical effect obtained by the disclosed subject matter is improving the scalability of quantum circuit optimization techniques. By implementing adaptive optimization approaches, such as hierarchical optimization strategies and parallel processing techniques, the system can effectively handle large-scale quantum circuits with numerous permutable operations, ensuring practical and efficient optimization across a wide range of circuit sizes and complexities.

Yet another technical effect obtained by the disclosed subject matter may be to improve performance when executing the quantum circuit. By implementing permutations that take into account hardware constraints, hardware-related inefficiencies, such as based on connectivity issues, may be mitigated and execution may be performed using fewer number of gates (e.g., less swap operations), cycles (e.g., smaller number of operations needed), or the like.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

The present disclosure relates to the field of quantum computing, and more specifically, to the optimization of quantum circuits through strategic permutation of input registers. Quantum operations within a quantum circuit may have input registers that can be permuted or interchanged without affecting the logical function of the operation. This permutability of input registers presents an opportunity for circuit optimization that is not fully exploited by existing quantum compilers and optimization techniques.

The selection of an optimal permutation for input registers can significantly impact the overall performance of a quantum circuit. Factors such as circuit depth, circuit width, gate count, and error rates may be improved through strategic permutation of input registers. However, the challenge lies in identifying which input registers are permutable and determining the optimal permutation that aligns with specific optimization goals.

The process of optimizing quantum circuits through permutation of input registers to gates or function blocks may involve complex decision-making and analysis. This optimization process may need to consider multiple factors simultaneously, such as the interdependencies between different quantum operations within the circuit and the impact of permutations on subsequent operations. The optimization process may balance local optimizations with global circuit performance.

As quantum circuits grow in complexity and size, the scalability of input register permutation optimization techniques may present challenges. Efficient methods for handling large-scale quantum circuits with numerous permutable operations may be necessary to ensure the practicality and effectiveness of the optimization process.

The present disclosure provides an adaptive optimization approach for permuting input registers in quantum circuits. A system may be deployed that dynamically selects and applies different optimization strategies based on the size and complexity of the quantum circuit being optimized. The system may employ a greedy algorithm that incrementally optimizes the circuit by selecting permutations for each operation in a topological order. Alternatively, the system may utilize a CSP solver to perform global optimization across multiple permutable operations simultaneously.

In addition to, or instead of the CSP solver, the system may employ alternative global optimization solvers to address the permutation of input registers across multiple operations. These alternatives may include solvers implementing metaheuristic algorithms such as genetic algorithms or simulated annealing, which can explore large solution spaces efficiently. In some cases, the solver may utilize integer programming or mixed-integer linear programming (MILP) formulations to model the permutation problem and find optimal solutions. Another approach may involve using reinforcement learning techniques, where an agent learns to make permutation decisions based on the circuit structure and optimization goals. These alternative solvers may offer different trade-offs between solution quality and computational resources, allowing the system to adapt to various circuit sizes and complexity levels.

The present disclosure also provides a flexible annotation system for identifying permutable registers in quantum circuits. The system may allow users to manually annotate permutable registers within quantum operations. Additionally, or alternatively, the system may incorporate automatic identification of permutable registers.

In summary, the present disclosure provides methods and systems for enhancing the efficiency and performance of quantum circuits through optimized permutation of input registers, providing a flexible and comprehensive system for identifying permutable registers in quantum circuits, and improving the scalability of quantum circuit optimization techniques.

Referring to FIG. 1A, a block diagram of a quantum circuit system with permutable registers is illustrated. The system comprises an operation module 100a having multiple input and output ports for qubits. The operation module 100a includes a first set of input registers 110 and a second set of input registers 120. The first set of input registers 110 includes input registers 111, 112, and 113, and the second set of input registers 120 includes input registers 121 and 122.

In some exemplary embodiments, the operation module 100a can have multiple sets of permutable input registers, where the sets themselves can also be permuted. For instance, the first set of input registers 110 and the second set of input registers 120 can be interchanged without affecting the function of the operation module 100a.

Each input register within a set is represented by a dashed outline, indicating that these registers can be permuted or interchanged within their respective sets. For example, input register 111 in the first set of input registers 110 can be interchanged with input register 112 or 113. Similarly, input register 121 in the second set of input registers 120 can be interchanged with input register 122.

In some cases, the operation module 100a may also include additional output 160, which is not part of the permutable register sets.

The operation module 100a processes the inputs from the register sets and produces outputs to the corresponding output register sets and the additional output 160. The arrangement of inputs and outputs suggests that the operation performed by module 100a involves multiple qubits simultaneously.

The permutability of the input register sets allows for optimization of the quantum circuit by selecting different arrangements of input registers based on specific optimization criteria. For instance, the system may select a permutation that minimizes the circuit depth, circuit width or reduces the gate count. In some cases, the system may also consider error rates or other performance metrics when selecting the optimal permutation.

In some exemplary embodiments, the system may use a greedy algorithm or a solver (e.g., CSP solver) to select the optimal permutation. The greedy algorithm may incrementally optimize the circuit by selecting permutations for each operation in a given order. On the other hand, the CSP solver may perform global optimization across multiple permutable operations simultaneously. The system may choose between these optimization methods based on the size and complexity of the quantum circuit.

In some cases, the system may also perform an intermediate transpilation step to reassign qubits based on the selected permutation before generating the optimized quantum circuit. This transpilation step may involve reordering the qubits or changing the gate operations to align with the selected permutation.

Figure 1B:
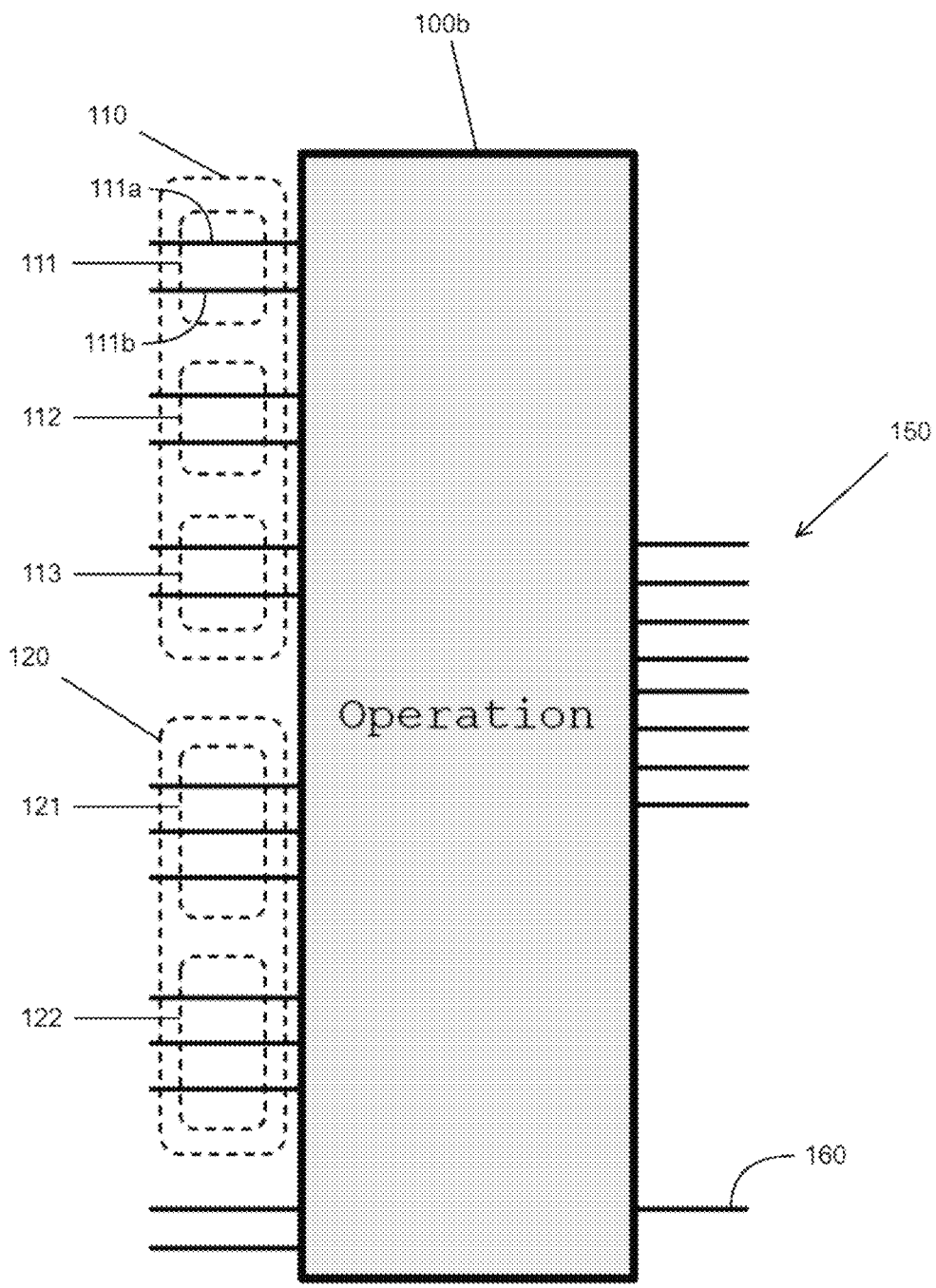
FIG. 1B illustrates a block diagram of a quantum circuit system with permutable registers, in accordance with some exemplary embodiments of the disclosed subject matter.

Referring to FIG. 1B, a block diagram of a quantum circuit system with permutable registers and junk output is illustrated. The system comprises an operation module 100b having multiple input and output ports for qubits. The operation module 100b includes a first set of input registers 110 and a second set of input registers 120. The first set of input registers 110 includes input registers 111, 112, and 113, and the second set of input registers 120 includes input registers 121 and 122.

In some exemplary embodiments, the operation module 100b can have multiple sets of permutable input registers, where the sets themselves can also be permuted. For instance, the first set of input registers 110 and the second set of input registers 120 can be interchanged without affecting the function of the operation module 100b.

Each input register within a set is represented by a dashed outline, indicating that these registers can be permuted or interchanged within their respective sets. For example, input register 111 in the first set of input registers 110 can be interchanged with input register 112 or 113. Similarly, input register 121 in the second set of input registers 120 can be interchanged with input register 122.

In some cases, the operation module 100b may also include additional output 160, which is not part of the permutable register sets. Additionally, or alternatively, the operation module 100b may include a junk output 150. The junk output 150 represents output registers that do not need to match the permutation of the input registers.

Figure 1C:
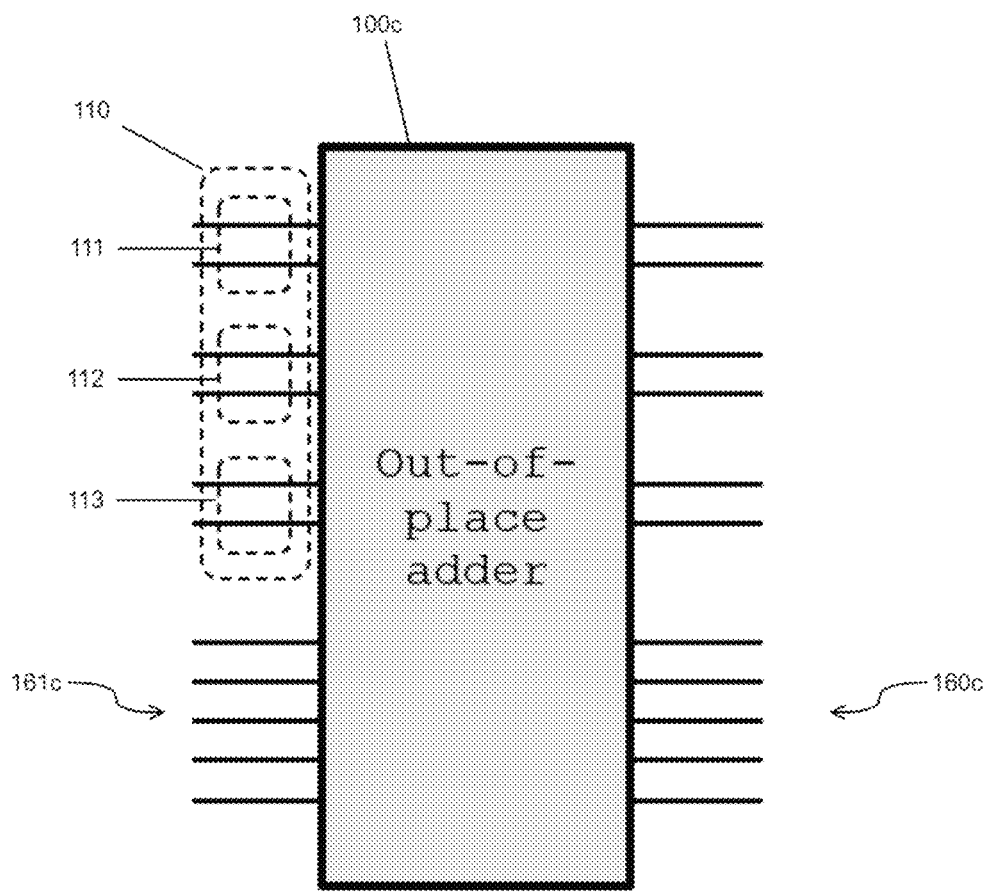
FIG. 1C illustrates a block diagram of a quantum circuit system featuring an out-of-place adder, in accordance with some exemplary embodiments of the disclosed subject matter.

Referring to FIG. 1C, a block diagram of a quantum circuit system featuring an Out-of-place adder 100c with permutable input registers is illustrated. The system comprises the Out-of-place adder 100c, which performs an operation of "a+b+c" such that all inputs are described by 2 qubits. The Out-of-place adder 100c has one set consisting of three registers (111, 112, 113), each containing 2 qubits. All registers in the set may be interchanged.

In some exemplary embodiments, the Out-of-place adder 100c may be a quantum gate that performs the addition operation on the input registers. The input registers 111, 112, and 113 represent the inputs "a", "b", and "c" respectively. Each input register within the first set of input registers 110 is represented by a dashed outline, indicating that these registers can be permuted or interchanged within the set. For example, input register 111 in the first set of input registers 110 can be interchanged with input register 112 or 113.

The result of the addition operation is placed in Result register 160c which has 5 qubits. The Result register 160c uses the qubits of additional input 161c. In some cases, the Result register 160c may be a separate register that is not part of the permutable register sets. The Result register 160c receives the output of the Out-of-place adder 100c and stores the result of the addition operation.

In some exemplary embodiments, the system may select a permutation of the input registers 111, 112, and 113 based on an optimization goal. The optimization goal may be based on factors such as circuit depth, circuit width, gate count, or error rate. The system may use a greedy algorithm or a CSP solver to select the optimal permutation. The selected permutation is then applied to the input registers, and the Out-of-place adder 100c performs the addition operation based on the permuted input registers.

In some cases, the system may also perform an intermediate transpilation step to reassign qubits based on the selected permutation before generating the optimized quantum circuit. This transpilation step may involve reordering the qubits or changing the gate operations to align with the selected permutation.

Figure 1D:
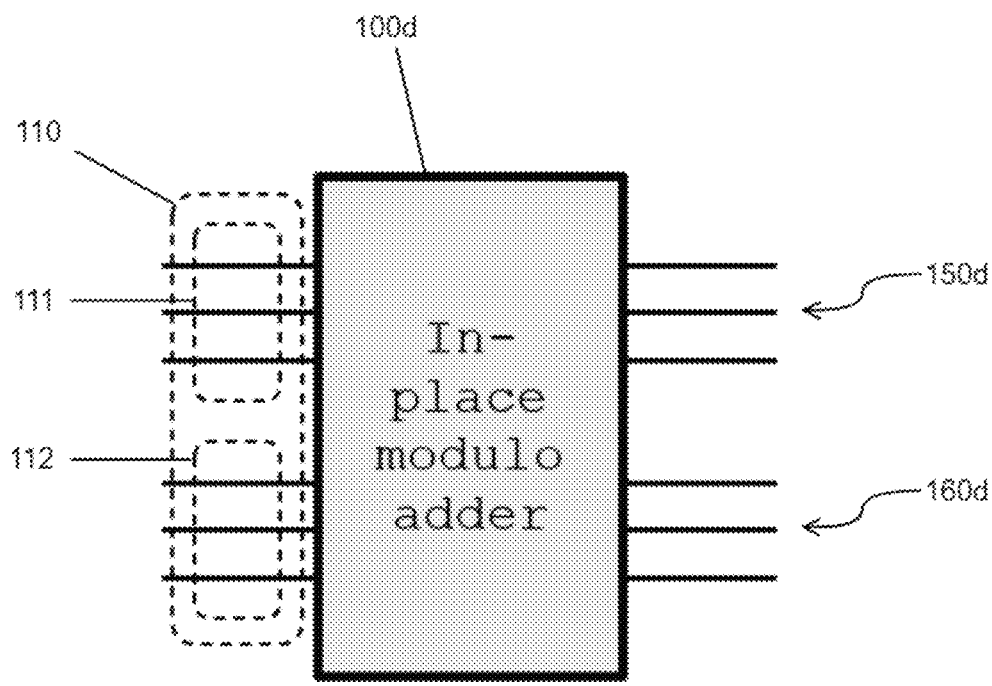
FIG. 1D illustrates a block diagram of a quantum circuit system featuring an in-place modulo adder, in accordance with some exemplary embodiments of the disclosed subject matter.

Referring to FIG. 1D, a block diagram of a quantum circuit system featuring an in-place modulo adder 100d with permutable input registers is illustrated. The system comprises the in-place modulo adder 100d, which performs an operation of "a+b mod 8" such that all inputs are described by 3 qubits. The in-place modulo adder 100d has one set consisting of two registers (111, 112), each containing 3 qubits. All registers in the set may be interchanged.

In some exemplary embodiments, the in-place modulo adder 100d may be a quantum gate that performs the modulo addition operation on the input registers. The input registers 111 and 112 represent the inputs "a" and "b" respectively. Each input register within the first set of input registers 110 is represented by a dashed outline, indicating that these registers can be permuted or interchanged within the set. For example, input register 111 in the first set of input registers 110 can be interchanged with input register 112.

The result of the modulo addition operation is placed in output registers 160d which have 3 qubits. In some cases, the output registers 160d may be separate registers that are not part of the permutable register sets. The output registers 160d receive the output of the in-place modulo adder 100d and store the result of the modulo addition operation.

In some exemplary embodiments, the system may select a permutation of the input registers 111 and 112 based on an optimization goal. The optimization goal may be based on factors such as circuit depth, circuit width, gate count, or error rate. The system may use a greedy algorithm or a CSP solver to select the optimal permutation. The selected permutation is then applied to the input registers, and the in-place modulo adder 100d performs the modulo addition operation based on the permuted input registers.

In some cases, the system may also perform an intermediate transpilation step to reassign qubits based on the selected permutation before generating the optimized quantum circuit. This transpilation step may involve reordering the qubits or changing the gate operations to align with the selected permutation.

Additionally, or alternatively, the operation module 100d may include junk registers 150d. The junk registers 150d represent output registers that do not need to match the permutation of the input registers. In some cases, the junk registers 150d are treated as junk and are not used in the following circuit in order for the permutation to be valid. This allows for more flexibility in the permutation of the input registers, as the output does not need to maintain a specific correspondence with the input registers.

Figure 1E:
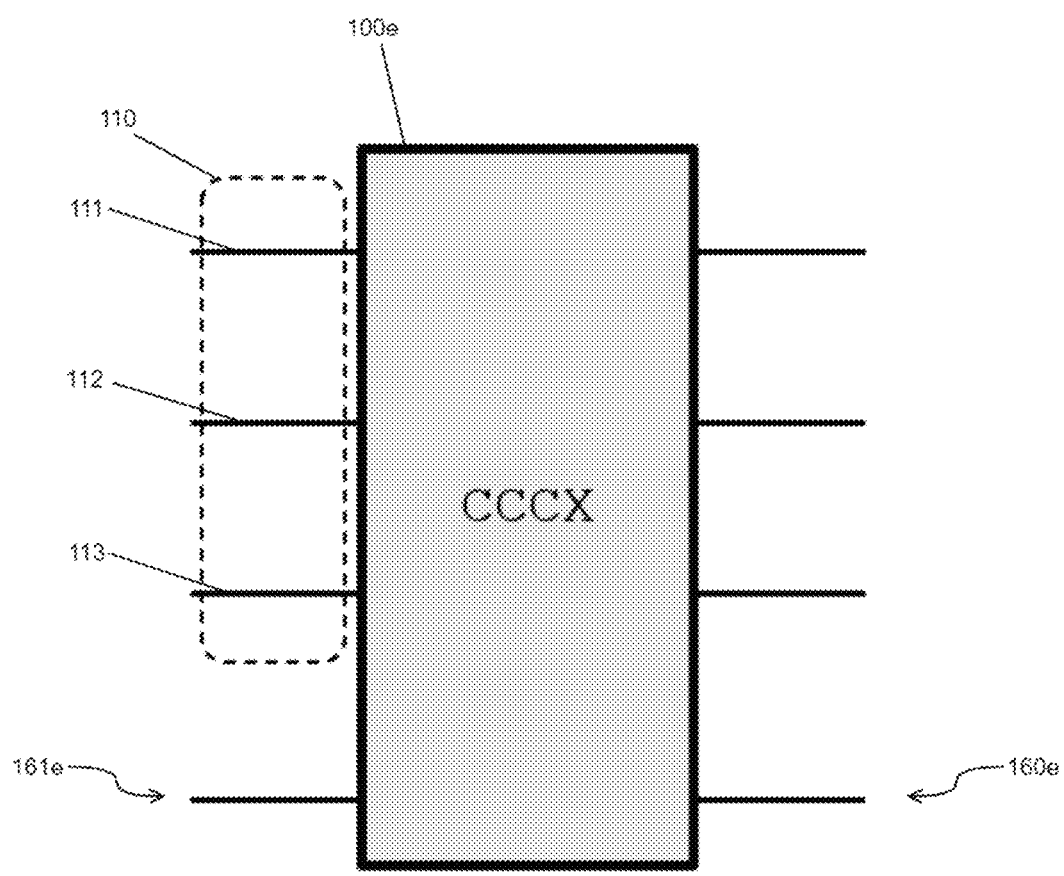
FIG. 1E illustrates a quantum circuit diagram featuring a CCCX gate, in accordance with some exemplary embodiments of the disclosed subject matter.

Referring to FIG. 1E, a quantum circuit diagram featuring a CCCX gate 100e with permutable input registers is illustrated. The diagram shows a first set of input registers 110 comprising three input registers: Input register 111, Input register 112, and Input register 113. These input registers are connected to the CCCX gate 100e. The first set of input registers 110 is indicated by a dashed outline encompassing the three input registers, suggesting that these inputs can be interchanged without affecting the overall function of the CCCX gate 100e. This configuration allows for optimization of the quantum circuit by selecting a permutation of these input registers based on specific optimization goals.

In some exemplary embodiments, the CCCX gate 100e performs a triple-controlled-NOT operation, where the state of the target qubit is flipped if and only if all three control qubits (represented by the Input registers 111, 112, and 113) are in the |1) state. The CCCX gate 100e has three control qubits and one target qubit. The control qubits are all equivalent; hence it has one set consisting of three registers, each containing one qubit. All registers in the set may be interchanged, and the target qubit is irrelevant for the patent.

Additionally, or alternatively, the CCCX gate 100e may include an Additional input 161e and a Target register 160e. The Additional input 161e and Target register 160e represent the target qubit for the CCCX operation, which is not part of the permutable set. The target qubit does not need to maintain a specific correspondence with the control qubits.

In some exemplary embodiments, the system may select a permutation of the control qubits based on an optimization goal. The selected permutation is then applied to the control qubits, and the CCCX gate 100e performs the triple-controlled-NOT operation based on the permuted control qubits.

In some cases, the system may also perform an intermediate transpilation step to reassign qubits based on the selected permutation before generating the optimized quantum circuit. This transpilation step may involve reordering the qubits or changing the gate operations to align with the selected permutation.

Figure 2:
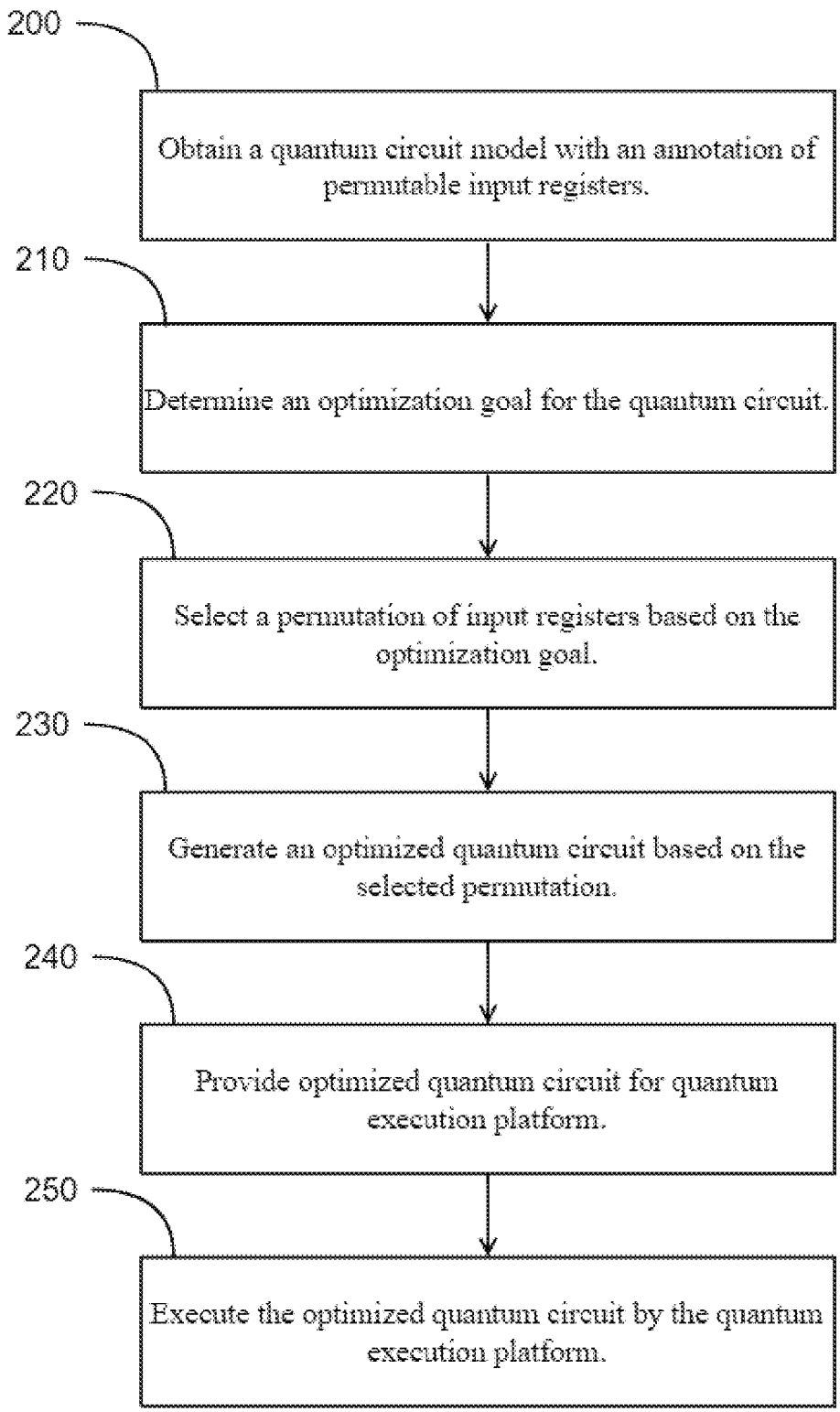
FIG. 2 illustrates a flowchart for a method of optimizing quantum circuits, in accordance with some exemplary embodiments of the disclosed subject matter.

Referring to FIG. 2, a flowchart for a method 200 of optimizing quantum circuits through permutation of input registers is illustrated. The method 200 comprises several steps aimed at enhancing the performance of quantum circuits.

In Step 210, a quantum circuit model is obtained with an annotation of permutable input registers. The annotation identifies which parts of the circuit can be adjusted for optimization. In some exemplary embodiments, the quantum circuit model may be obtained from a quantum circuit design tool. In some exemplary embodiments, the annotation of permutable input registers may be provided by the quantum circuit designer, or it may be automatically detected by the system based on the structure and properties of the quantum operations in the circuit. Additionally, or alternatively, the quantum circuit model may be a quantum program that is represented using a Directed Acyclic Graph (DAG). Additionally, or alternatively, the quantum circuit model may be at a functional level, at a gate level, or the like. Additionally, or alternatively, the quantum circuit model may be a logical quantum circuit or a physical quantum circuit. Different representations of quantum circuits are discussed in U.S. Patent Application Publication No. 2023/0112525, entitled "Provisioning functional-level information to be utilized in gate-level processing of quantum circuits", filed Oct. 12, 2021, U.S. Pat. No. 11,288,589, entitled "Quantum circuit modeling", filed Jan. 14, 2021, U.S. Pat. No. 11,615,337, entitled "Determining quantum error correction schemes", filed Apr. 18, 2022, U.S. Patent Publication No. 2023/0237360, entitled "Auxiliary qubits analysis based on partial compilation of quantum programs", filed Jan. 24, 2022, all of which are hereby incorporated by reference in their entirety without giving rise to disavowment. The disclosed subject matter may be applicable to quantum circuit models irrespective of their manner of representation.

In Step 220, an optimization goal for the quantum circuit is determined. This step establishes the criteria for improving the circuit's performance. In some exemplary embodiments, the optimization goal may be based on one or more metrics such as circuit depth, circuit width, gate count, error rate, or a combination thereof. The optimization goal may be specified by the quantum circuit designer, or it may be automatically selected by the system based on the characteristics of the quantum circuit and the capabilities of the quantum execution platform.

In Step 230, a permutation of input registers is selected based on the optimization goal. This selection process aims to arrange the input registers in a way that aligns with the determined optimization goal. In some exemplary embodiments, the system may use a greedy algorithm to incrementally optimize the circuit by selecting permutations for each operation in a given order. Additionally, or alternatively, the system may use a solver to perform global optimization across multiple permutable operations simultaneously. The selection of the permutation may also consider the dependencies between different quantum operations in the circuit and the impact of the permutation on subsequent operations.

In Step 240, an optimized quantum circuit is generated based on the selected permutation. This step implements the chosen arrangement of input registers to create a potentially more efficient version of the circuit. In some exemplary embodiments, the system may perform an intermediate transpilation step to reassign qubits based on the selected permutation before generating the optimized quantum circuit. This transpilation step may involve reordering the qubits or changing the gate operations to align with the selected permutation.

In Step 250, the generated optimized quantum circuit may be provided for a quantum execution platform. This step prepares the optimized circuit for practical application. In some exemplary embodiments, the quantum execution platform may be a quantum computer or a simulator of a quantum computer. The quantum execution platform executes the optimized quantum circuit, allowing for the practical implementation and testing of the optimized circuit.

Figure 3:
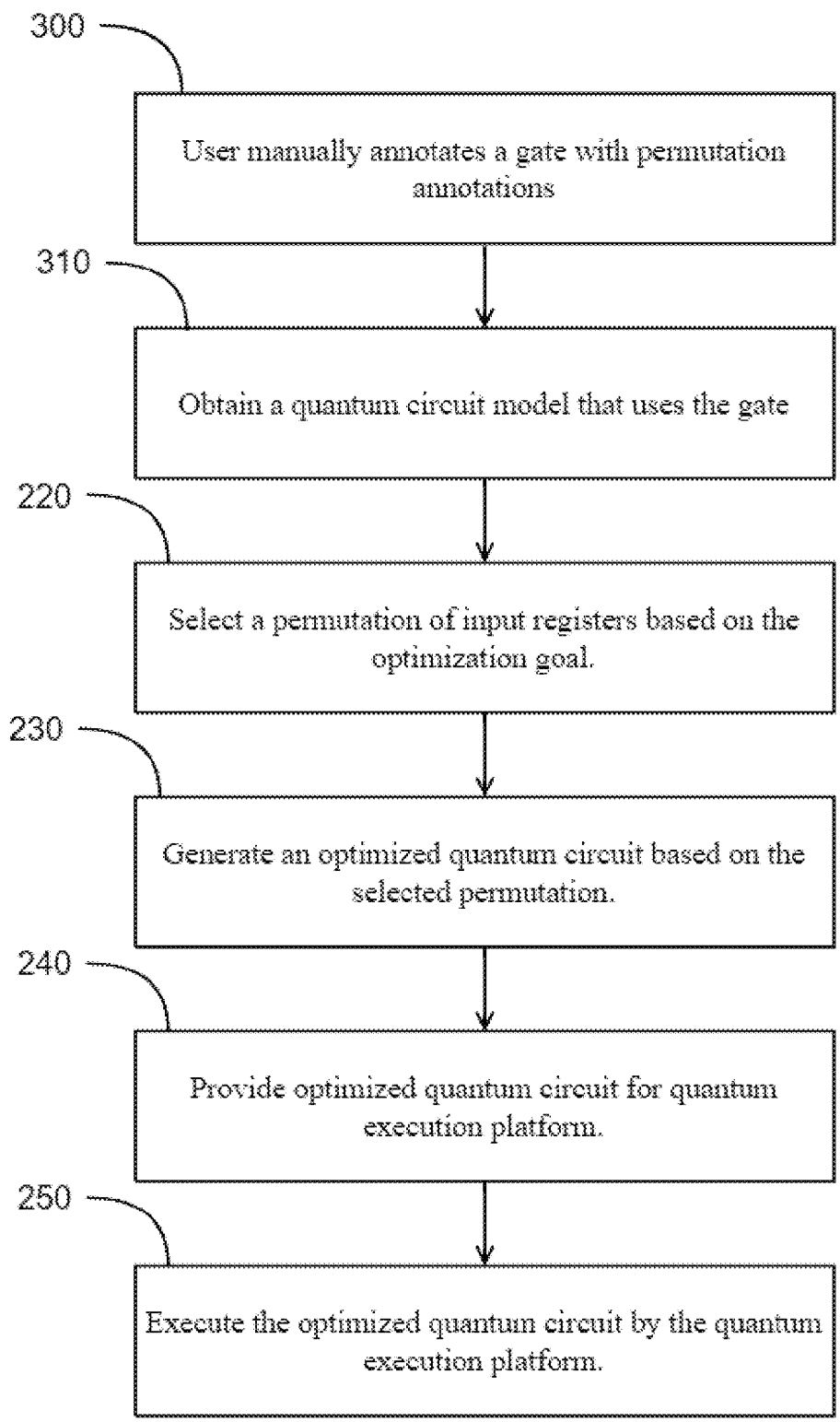
FIG. 3 illustrates a flowchart for a method of optimizing quantum circuits, in accordance with some exemplary embodiments of the disclosed subject matter.

Referring to FIG. 3, a flowchart for a method 300 of optimizing quantum circuits through manual annotation and permutation of input registers is illustrated. The method 300 comprises several steps aimed at enhancing the performance of quantum circuits.

In Step 300, a user manually annotates a gate with permutation annotations. This initial step defines potential permutations that can be applied to the quantum circuit. In some exemplary embodiments, the user may annotate the gate using a graphical user interface provided by a quantum circuit design tool. The user may select the gate and specify which input registers are permutable. The user may also specify whether the output registers need to be permuted in the same way as the input registers. The user may provide these annotations based on their knowledge of the quantum operation performed by the gate and the desired optimization goals. The manual annotation of gates with permutation annotations provides valuable insights and serves as a guide for the optimization algorithms which may be employed during the compilation or transpilation process that the circuit undergoes.

In Step 310, the quantum circuit model that utilizes the annotated gate is obtained, similarly to Step 210 of FIG. 2.

The remaining steps of the method 300, namely Steps 220, 230, 240, and 250, are similar to the corresponding steps in the method described with reference to FIG. 2. These steps involve determining an optimization goal for the quantum circuit, selecting a permutation of input registers based on the optimization goal, generating an optimized quantum circuit based on the selected permutation, and providing the optimized quantum circuit for execution by a quantum execution platform. These steps are performed in the same manner as described above with reference to FIG. 2.

In some exemplary embodiments, the manual annotation of gates with permutation annotations may be combined with automatic identification of permutable registers. For instance, the system may automatically identify permutable registers based on the structure and properties of the quantum operations in the circuit, and the user may manually annotate additional permutable registers based on their knowledge of the quantum operations. This hybrid approach may leverage both human expertise and computational analysis to enable more effective and context-aware optimizations across a wide range of quantum circuit designs.

Figure 4:
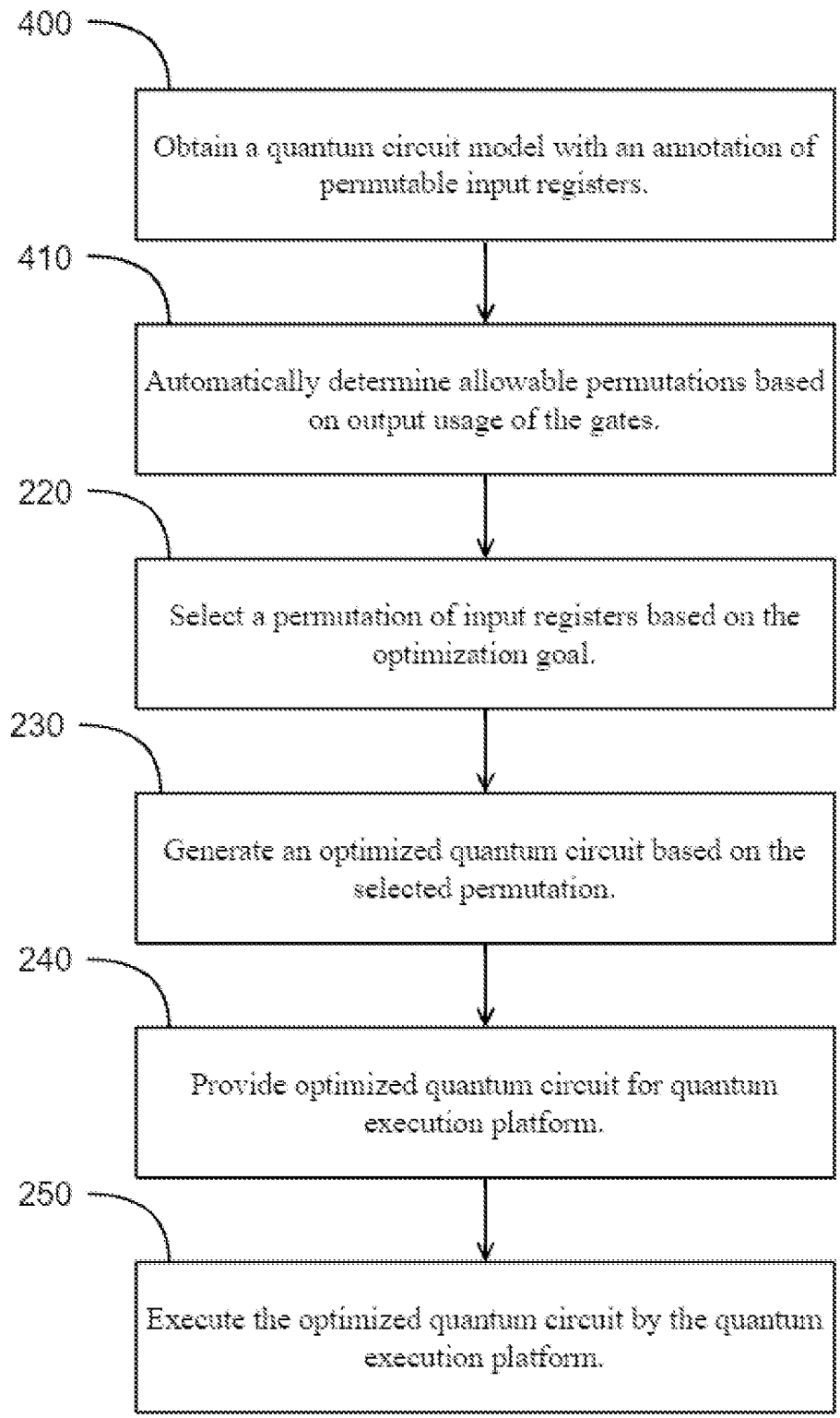
FIG. 4 illustrates a flowchart for a method of optimizing quantum circuits, in accordance with some exemplary embodiments of the disclosed subject matter.

Referring to FIG. 4, a flowchart for a method 400 of optimizing quantum circuits through automatic determination of permutable input registers is illustrated. The method 400 comprises several steps aimed at enhancing the performance of quantum circuits.

In Step 400, a quantum circuit model is obtained with an annotation of permutable input registers. This step is similar to Step 210 of FIG. 2 and involves obtaining a quantum circuit model that includes one or more quantum operations, wherein at least one quantum operation is marked as having permutable input registers. The annotation identifies which parts of the circuit can be adjusted for optimization.

In Step 410 allowable permutations are automatically determined based on output usage of the gates. In some exemplary embodiments, this step assesses the circuit to identify feasible rearrangements of the input registers that maintain the circuit's functionality. This automatic determination may involve analyzing the data flow through the circuit and identifying which outputs are used in subsequent operations. Based on this analysis, the system may determine which outputs can be treated as "junk" and do not need to maintain a specific correspondence with the input registers. This automatic determination of allowable permutations provides a flexible and efficient approach to optimizing quantum circuits, as it allows the system to adapt to the specific characteristics and requirements of each circuit.

The remaining steps of the method 400, namely Steps 220, 230, 240, and 250, are similar to the corresponding steps in the method described with reference to FIG. 2. These steps involve determining an optimization goal for the quantum circuit, selecting a permutation of input registers based on the optimization goal, generating an optimized quantum circuit based on the selected permutation, and providing the optimized quantum circuit for execution by a quantum execution platform. These steps are performed in the same manner as described above with reference to FIG. 2.

In some exemplary embodiments, the automatic determination of allowable permutations may be combined with manual annotation of permutable registers. For instance, the system may automatically identify permutable registers based on the structure and properties of the quantum operations in the circuit, and the user may manually annotate additional permutable registers based on their knowledge of the quantum operations. This hybrid approach may leverage both computational analysis and human expertise to enable more effective and context-aware optimizations across a wide range of quantum circuit designs.

Figure 5:
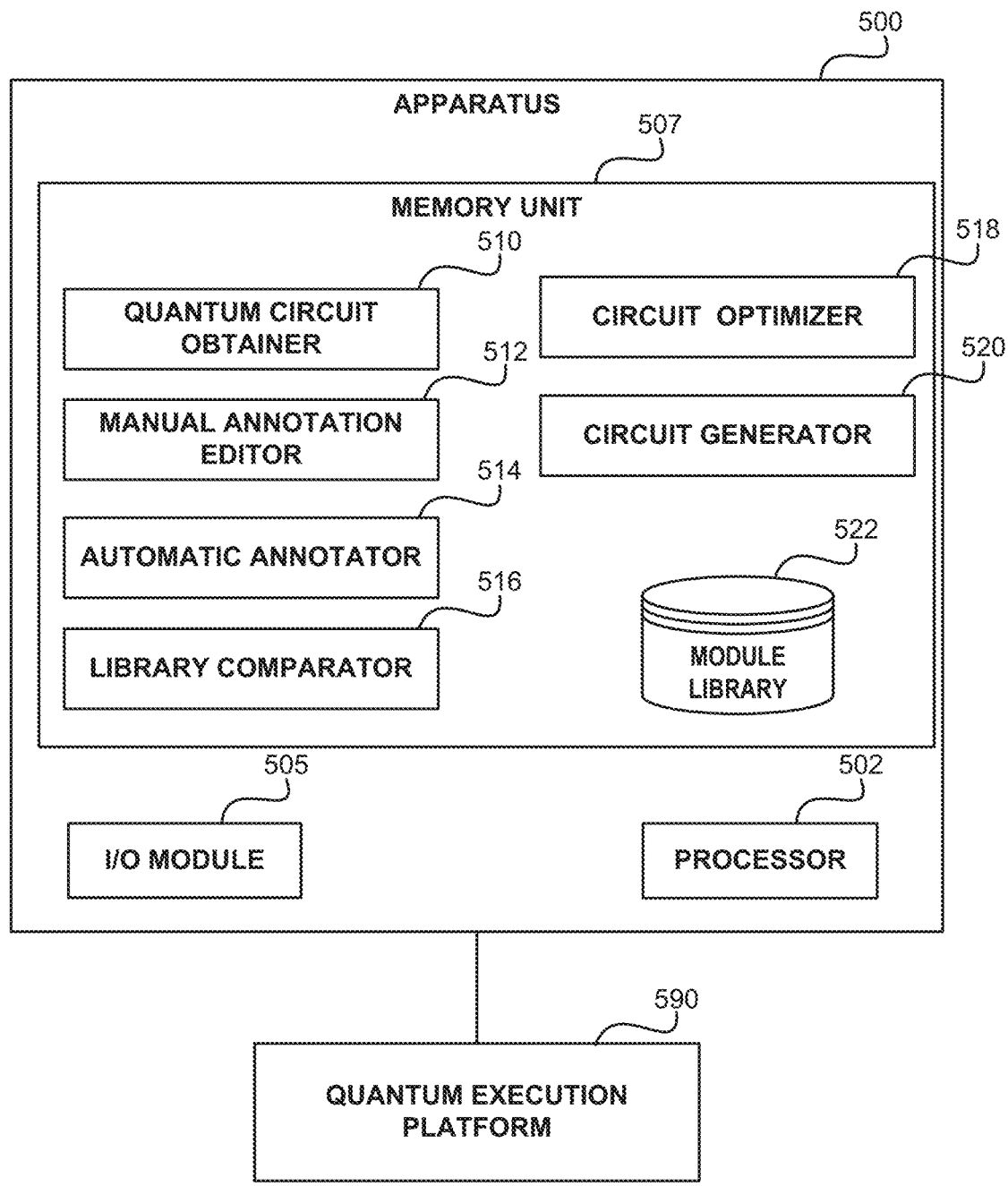
FIG. 5 illustrates a block diagram of an apparatus for optimizing quantum circuits, in accordance with some exemplary embodiments of the disclosed subject matter.

Referring to FIG. 5, a block diagram of an apparatus 500 for optimizing quantum circuits is illustrated. The apparatus 500 includes a memory unit 507, an input/output module 505, a processor 502, and is connected to a quantum execution platform 590.

The memory unit 507 contains several components for quantum circuit optimization. These include a quantum circuit obtainer 510 for acquiring quantum circuit models, a manual annotation editor 512 for user-defined annotations, an automatic annotator 514 for automated circuit analysis, a library comparator 516 for comparing circuit elements with predefined libraries, a circuit optimizer 518 for optimizing the quantum circuit, and a circuit generator 520 for producing the optimized circuit.

In some exemplary embodiments, the quantum circuit obtainer 510 may acquire the initial quantum circuit model from a quantum circuit design tool or a quantum program. The quantum circuit model may include one or more quantum operations, wherein at least one quantum operation is marked as having permutable input registers. The annotation of permutable input registers may be provided by the quantum circuit designer, or it may be automatically detected by the automatic annotator 514 based on the structure and properties of the quantum operations in the circuit.

The manual annotation editor 512 allows users to manually annotate permutable registers within quantum operations. This manual annotation process may provide valuable insights and serve as a guide for the optimization algorithms which may be employed during the compilation or transpilation process that the circuit undergoes.

The automatic annotator 514 provides automated circuit analysis and identification of permutable registers. In some exemplary embodiments, this automatic identification may be based on comparing the gates or operations in the quantum circuit to a pre-annotated library of known quantum operations stored in a module library 522. The library comparator 516 can identify modules in the circuit obtained by circuit obtainer 510 that are listed in module library 522 and use their annotation. In some cases, automatic annotator 514 may ensure that some output are handled as junk in the circuit obtained by circuit obtainer 510 before relying on a pre-defined annotation or in order to determine if permutation in the output is also required.

The circuit optimizer 518 uses the annotations and comparisons to optimize the quantum circuit. In some exemplary embodiments, the circuit optimizer 518 may use a greedy algorithm or a CSP solver to select the optimal permutation of input registers. The selected permutation is then applied to the input registers, and the circuit optimizer 518 generates an optimized quantum circuit based on the selected permutation.

The circuit generator 520 produces the optimized quantum circuit. In some exemplary embodiments, the circuit generator 520 may perform an intermediate transpilation step to reassign qubits based on the selected permutation before generating the optimized quantum circuit. This transpilation step may involve reordering the qubits or changing the gate operations to align with the selected permutation.

The input/output module 505 facilitates data input and output for the apparatus 500. The input/output module 505 may receive the quantum circuit model from a quantum circuit design tool or a quantum program, and it may provide the optimized quantum circuit to a quantum execution platform for execution.

The processor 502 executes the operations of the various components within the memory unit 507. The processor 502 is configured to execute the instructions to obtain a quantum circuit model comprising one or more quantum operations, wherein at least one quantum operation is marked as having permutable input registers, determine an optimization goal for the quantum circuit, select a permutation of the input registers for the at least one marked quantum operation based on the optimization goal, and generate an optimized quantum circuit based on the selected permutation. The processor 502 may be a classic processor, an integrated circuit (IC), a Central Processing Unit (CPU), a Graphical Processing Unit (GPU), or the like. In some exemplary embodiments, some or all of the functionalities, such as those performed by circuit optimizer 518, may be executed by a quantum processor, which may or may not be part of the quantum execution platform 590. In some cases, processor 502 may include a plurality of different processors, wherein different functionalities may be implemented using different processors.

The quantum execution platform 590 is connected to the apparatus 500 and is responsible for executing the optimized quantum circuits generated by the apparatus 500. Quantum execution platform 590 can be a quantum computer, a simulator of a quantum computer that is executed on a classic computer, or the like.

In some exemplary embodiments, the module library 522 stores predefined quantum circuit modules and annotations. In some exemplary embodiments, the module library 522 may include a collection of quantum operations or gates, each associated with a set of permutable input registers. The module library 522 may also include annotations that specify the permutable input registers for each quantum operation or gate. These annotations may be provided by quantum circuit designers, or they may be automatically generated based on the structure and properties of the quantum operations or gates.

In some exemplary embodiments, the module library 522 may be used by the library comparator 516 to compare the quantum operations in the quantum circuit obtained by the quantum circuit obtainer 510 with the predefined quantum operations in the module library 522. If a match is found, the library comparator 516 may use the annotations associated with the matching quantum operation in the module library 522 to annotate the corresponding quantum operation in the quantum circuit. This automatic annotation process may provide a quick and efficient way to identify permutable input registers in the quantum circuit.

In some exemplary embodiments, the module library 522 may be updated or expanded over time to include new quantum operations or gates and their associated annotations. The module library 522 may also be customized or tailored to specific quantum computing platforms or technologies, allowing for more targeted and effective optimization of quantum circuits.

In some exemplary embodiments, the module library 522 may be organized in a hierarchical structure, with different levels or categories for different types of quantum operations or gates. This hierarchical structure may facilitate efficient searching and retrieval of quantum operations or gates and their associated annotations.

In some exemplary embodiments, the module library 522 may include metadata or additional information about each quantum operation or gate, such as the number of qubits involved, the computational complexity, the error rate, or other performance metrics. This additional information may be used by the circuit optimizer 518 to make more informed decisions when selecting permutations of input registers.

In some exemplary embodiments, the module library 522 may include a user interface that allows quantum circuit designers to browse, search, or modify the quantum operations or gates and their associated annotations. The user interface may also provide visualization tools that highlight the permutable input registers for each quantum operation or gate, helping users to understand the optimization opportunities present in their circuits.

In some exemplary embodiments, the module library 522 may be integrated with other components of the apparatus 500, such as the quantum circuit obtainer 510, the manual annotation editor 512, the automatic annotator 514, the library comparator 516, the circuit optimizer 518, and the circuit generator 520, to provide a comprehensive and integrated solution for optimizing quantum circuits through permutation of input registers.

In some exemplary embodiments, the processor 502 may be further configured to replace qubits of undecided permutable operations with a placeholder circuit (e.g., symmetric graph state) during optimization. This placeholder technique may be used when evaluating undecided permutations in a subcircuit. This involves temporarily replacing the qubits of permutable operations with a placeholder circuit, allowing for efficient estimation of the impact of different permutations without fully evaluating all possibilities. This technique may improve the efficiency of the optimization process, particularly for large circuits with numerous permutable operations.

Additionally, or alternatively, the processor 502 may be further configured to perform an intermediate transpilation step to reassign qubits based on the selected permutation before generating the optimized quantum circuit. This transpilation step may involve reordering the qubits or changing the gate operations to align with the selected permutation. This intermediate processing step may enhance the effectiveness of the optimization process by ensuring that the physical implementation of the quantum circuit aligns with the selected permutation.

The automatic annotator 514 may play a crucial role in handling circuit outputs. In some exemplary embodiments, the automatic annotator 514 may analyze the usage of output registers to automatically determine whether the output needs to correspond to the input and be similarly permuted. This analysis may involve examining the data flow through the circuit and identifying which outputs are used in subsequent operations. Based on this analysis, the automatic annotator 514 may determine which outputs can be treated as "junk" and do not need to maintain a specific correspondence with the input registers. This automatic determination of output handling may provide a flexible and efficient approach to optimizing quantum circuits, as it allows the system to adapt to the specific characteristics and requirements of each circuit.

In some exemplary embodiments, the system may employ various optimization algorithms to select the optimal permutation of input registers. For instance, the system may use a greedy algorithm to incrementally optimize the quantum circuit. In this approach, the system may traverse the quantum circuit operation by operation, selecting the permutation that optimizes the subcircuit constructed so far and the encountered permutable operations at each step. This greedy approach may be particularly effective for simpler circuits or components, where local optimizations can lead to significant improvements in overall circuit performance.

Additionally, or alternatively, the system may use a Constraint Satisfaction Problem (CSP) solver to perform global optimization across multiple permutable operations simultaneously. The CSP solver may consider interdependencies between different quantum operations and find optimal permutations that maximize overall circuit performance. This global optimization approach may be particularly effective for larger, more complex circuits, where the interplay between different permutable operations can have a significant impact on the optimization goal.

In some exemplary embodiments, the system may employ other types of solvers or optimization algorithms to select the optimal permutation of input registers. For instance, the system may use a linear programming solver, a theorem prover, a genetic algorithm, a simulated annealing algorithm, or a quantum-inspired optimization technique. Each of these methods may offer different trade-offs between optimization quality and computational complexity, allowing the system to adapt to the specific requirements of the quantum circuit and the optimization goal.

In some exemplary embodiments, the system may employ a placeholder strategy to improve the efficiency of the optimization process. For instance, when evaluating the value of a decision of a sub-circuit with one or more permutable operations with a yet-undecided permutation, the system may use a placeholder circuit. This involves replacing all corresponding qubits of any permutable operation with the placeholder circuit. For example, a symmetric graph state, which is a circuit that has a CZ gate between all pairs of qubits, may be used as a placeholder. This placeholder strategy may allow the system to efficiently estimate the impact of different permutations without fully evaluating all possibilities. This strategy may be particularly effective for large circuits with numerous permutable operations, where the computational cost of evaluating all possible permutations can be prohibitive.

In some exemplary embodiments, the system may perform an intermediate transpilation step to reassign qubits based on the selected permutation before generating the optimized quantum circuit. This transpilation step may involve reordering the qubits or changing the gate operations to align with the selected permutation. This intermediate processing step may enhance the effectiveness of the optimization process by ensuring that the physical implementation of the quantum circuit aligns with the selected permutation. This step may be particularly important when the quantum circuit is transpiled to physical qubits, as the physical layout and connectivity of the qubits can significantly impact the performance of the quantum circuit.

A number of implementations have been described. Nevertheless, it will be understood that various modifications may be made without departing from the spirit and scope of the disclosure. Accordingly, other implementations are within the scope of the following claims.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), electrical signals transmitted through a wire, Quantum Random Access Memory (QRAM), photons, trapped ions, lasers, cold atoms, or the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method for optimizing a quantum circuit, comprising:
   obtaining a quantum circuit model comprising one or more quantum operations, wherein at least one quantum operation is marked as having permutable input registers, wherein said obtaining comprises an unmarked quantum circuit model and automatically marking the at least one quantum operation as having permutable input registers;
   determining an optimization goal for the quantum circuit;
   selecting, by a processor, a permutation of the input registers for the at least one marked quantum operation based on the optimization goal; and
   generating an optimized quantum circuit based on the selected permutation.

2. The method of claim 1, wherein the optimization goal is based on at least one item selected from a group consisting of: circuit depth, circuit width, gate count, and error rate.

3. The method of claim 1, wherein said selecting the permutation comprises using a greedy algorithm to optimize the quantum circuit incrementally.

4. The method of claim 1, further comprising:
   performing an intermediate transpilation step to reassign qubits based on the selected permutation before generating the optimized quantum circuit.

5. The method of claim 1, further comprising: providing the generated optimized quantum circuit for execution by a quantum execution platform.

6. A method comprising:
   obtaining a quantum circuit model comprising one or more quantum operations, wherein at least one quantum operation is marked as having permutable input registers;
   determining an optimization goal for the quantum circuit;
   selecting, by a processor, a permutation of the input registers for the at least one marked quantum operation based on the optimization goal, wherein said selecting the permutation comprises using an optimization solver to optimize the quantum circuit globally, wherein during optimization, qubits of undecided permutable operations are replaced with a placeholder circuit; and
   generating an optimized quantum circuit based on the selected permutation.

7. A system for optimizing a quantum circuit, comprising:
   a memory storing instructions; and
   a processor configured to execute the instructions to:
      obtain an unmarked quantum circuit model comprising one or more quantum operations,
      automatically marking at least one quantum operation of the one or more quantum operations as having permutable input registers;
      determine an optimization goal for the quantum circuit;
      select a permutation of the input registers for the at least one marked quantum operation based on the optimization goal; and
      generate an optimized quantum circuit based on the selected permutation.

8. The system of claim 7, wherein the optimization goal is based on at least one item selected from a group consisting of: circuit depth, circuit width, gate count, or and error rate.

9. The system of claim 7, wherein selecting the permutation comprises using a greedy algorithm to optimize the quantum circuit incrementally.

10. The system of claim 7, wherein selecting the permutation comprises using an optimization solver to optimize the quantum circuit globally.

11. The system of claim 10, wherein the processor is further configured to replace qubits of undecided permutable operations with a a-placeholder circuit during optimization.

12. The system of claim 7, wherein the processor is further configured to perform an intermediate transpilation step to reassign qubits based on the selected permutation before generating the optimized quantum circuit.

13. The system of claim 7, wherein the processor is further configured to provide the generated optimized quantum circuit for execution by a quantum execution platform.

14. A non-transitory computer-readable storage medium storing program instructions that, when executed by a processor, cause the processor to:
obtain an unmarked quantum circuit model comprising one or more quantum operations;
automatically mark at least one quantum operation of the one or more quantum operations as having permutable input registers;
determine an optimization goal for the quantum circuit;
select a permutation of the input registers for the at least one marked quantum operation based on the optimization goal; and
generate an optimized quantum circuit based on the selected permutation.

15. The non-transitory computer-readable storage medium of claim 14, wherein the optimization goal is based on at least one item selected from a group consisting of: circuit depth, circuit width, gate count, and error rate.

16. The non-transitory computer-readable storage medium of claim 5, wherein selecting the permutation comprises using a greedy algorithm to optimize the quantum circuit incrementally.

17. The non-transitory computer-readable storage medium of claim 14, wherein selecting the permutation comprises using an optimization solver to optimize the quantum circuit globally.

18. A system comprising:
a memory storing instructions; and
a processor configured to execute the instructions to:
obtain a quantum circuit model comprising one or more quantum operations, wherein at least one quantum operation is marked as having permutable input registers;
determine an optimization goal for the quantum circuit;
select a permutation of the input registers for the at least one marked quantum operation based on the optimization goal, wherein the selection of the permutation comprises using an optimization solver to optimize the quantum circuit globally, wherein during optimization, qubits of undecided permutable operations a replaced with a placeholder circuit; and
generate an optimized quantum circuit based on the selected permutation.

* * * * *